United States Patent
Baskin et al.

[15] 3,635,725

[45] Jan. 18, 1972

[54] UREA GRAIN PRODUCT

[72] Inventors: Herbert A. Baskin, Covington; Andrew B. Funk, Memphis, both of Tenn.

[73] Assignee: W. R. Grace & Co., New York, N.Y.

[22] Filed: Nov. 17, 1969

[21] Appl. No.: 877,437

[52] U.S. Cl. ................................................. 99/2
[51] Int. Cl. ............................................. A23k 1/00
[58] Field of Search .......................... 99/2, 2 N; 127/70

[56] References Cited

UNITED STATES PATENTS

| 3,490,912 | 1/1970 | Freese | 99/2 |
| 2,768,895 | 10/1956 | Kamlet | 99/2 |
| 2,861,886 | 11/1958 | Colby et al. | 99/2 |

OTHER PUBLICATIONS

Chemical Abstracts Vol. 69, 1968 pages 1694– 1965, 181569

A New Urea Product For Ruminants Bartley et al.–Feedstuffs 1968 40(17) pages 9, 52, 54 (Eng.)

*Primary Examiner*—Norman Yudkoff
*Assistant Examiner*—Hiram H. Bernstein
*Attorney*—Charles L. Harness and Kenneth E. Prince

[57] ABSTRACT

This invention is directed to the process of mixing molten urea with starch-containing material, e.g., grain, in the absence of added moisture and at atmospheric pressure to provide an improved feed product for ruminants. In the process, the starch of the grain becomes at least partially gelatinized. By processing of the urea and grain after admixture thereof, much higher relative amounts of urea may be combined with the grain without toxic effects on the ruminant upon feeding thereof and with more efficient utilization of the urea. A novel feature is that the product solidifies as it is cooled, and if this is solidification is accomplished with continued mixing, a semigranular product results, which requires grinding of only the oversize portion to yield a desirable product.

5 Claims, No Drawings

UREA GRAIN PRODUCT

This invention is a food product containing nitrogen in a nonprotein form for use in the feeding of ruminant animals and a method for producing the same wherein a nonprotein nitrogenous substance is combined with a food containing starch such as grain in a manner which increases the efficiency of the nonprotein nitrogen in the production of microbial protein by rumen micro-organisms without deleterious effects to the ruminant animal.

Ruminants such as cattle, sheep and goats have a complex digestive tract including several stomachlike organs. The first of these stomachs is called the rumen. It is this organ which first receives the swallowed food and then regurgitates it in masses while the animal is resting. The mixture is then reswallowed and passed again into the rumen, where it is then fermented by micro-organisms (bacteria and protozoa). In the rumen, bacteria find an environment which provides a home for a substantial population of micro-organisms. These bacteria are capable of hydrolyzing urea and other nonprotein nitrogen sources such as ammonium salts into ammonia when the same are present in the food passed into the rumen. This ammonia is metabolized by the bacteria in the rumen to form amino acids and then microbial protein which is usable by the animal to supplement its normal protein diet, thus allowing the natural protein intake of the animal to be decreased when nonprotein nitrogen is included with the rations fed to such an animal.

Theoretically, there are enough bacteria present in the rumen of such an animal to metabolize the ammonia and form all of the protein required for the maintenance and production of the animal. Naturally occurring feed materials contain approximately 8-16 percent protein by weight. Urea as presently commercially available contains about 42 to 46 percent nitrogen by weight depending on the type or grade thereof and thus one pound of urea will replace roughly 15 to 35 pounds of such natural protein feed (on a protein basis). One pound of urea plus an amount of energy equivalent to that occurring in a natural protein is less expensive than an equivalent amount of natural protein feed, and therefore, it is desirable from an economical standpoint to supply as much as possible of the protein required in the animals' diet from a nonprotein nitrogen source such as urea. However, it is desirable that the nitrogenous substance and the carbohydrate material be broken down at substantially the same rate for most efficient production of microbial protein.

Due to the foregoing, large amounts of urea, and other sources of nonprotein nitrogen, are used in the beef and milk producing industries. This use is, however, limited by the toxic nature of such nonprotein nitrogen. This problem arises in that the bacteria in the rumen acts to hydrolyze urea etc., into ammonia which, in turn, is metabolized by the bacteria to form amino acids and then microbial protein. However, should the ammonia be liberated at a rate such that it is absorbed through the rumen wall rather than being converted to microbial protein, the blood ammonia level can rise, and it it becomes sufficiently elevated the death of the animal can result. It is this problem, i.e., rapid hydrolyzation of nonprotein nitrogenous substances in heretofore used forms that have made necessary the limitations imposed on the relative amount of such nitrogen in the feed and on the total intake by the animal during any certain period.

The unpalatability of such feed is another problem, since ruminants will often reject such a feed, even if the quantity of urea contained therein is insufficient to cause severe toxic effects. Thus, this palatability problem has decreased the practical effect which would otherwise be obtainable through the use of nonprotein nitrogen feed supplementation.

An additional problem has been the inefficient utilization of the ammonia formed by the hydrolyzation of the nonprotein nitrogen source. Even if the rate at which ammonia is absorbed through the rumen wall is not sufficient to cause severe toxic effects, some ammonia so absorbed is lost by the elimination processes of the animal, and thus rendered unavailable to form microbial protein. This too decreases the economics of such practices and limits the benefits otherwise theoretically obtainable. Also, in prior art composition, the inclusion of urea in amounts in excess of about 5 percent by weight in the starch-plus-urea-plus-minerals formula in pelleted feed supplements results in increased difficulty in pelleting, and during subsequent storage of the pellets the increased urea content results in increased caking tendencies.

It is, therefore, an object of this invention to provide a novel feed for ruminant animals containing a starch-bearing material combined with a greater quantity of urea, than has heretofore been possible, while maintaining the toxicity thereof at a nonharmful level and without decreasing the palatability thereof so that a greater quantity of the ammonia normally present in the rumen of such an animal can be converted into microbial protein by the metabolism of the nonprotein nitrogen with such bacteria, thus decreasing the quantity of protein which otherwise is required to be fed to the animal as a part of its normal diet. As a corollary to this object, it is an aim of this invention to provide such a feed as described which is gelatinized so that after the feed has been eaten by the animal and is therefore situated in the rumen thereof, the action of the rumen bacteria population to hydrolyze the urea into ammonia is inhibited and the rate of ammonia released is controlled at a level such that the bulk of the ammonia produced is metabolized by the bacteria to form microbial protein rather than absorbed through the rumen wall to cause toxic complications in the animal's organs, or at least to be wasted by natural elimination processes.

Another object of this invention is to provide a feed for ruminant animals containing urea, wherein the tendency of the latter to be converted to ammonia by rumen bacteria attack is inhibited and thus the rate of ammonia release in the rumen at any given time is reduced so that the rate of the ammonia absorption through the rumen wall is lower than when heretofore known feeds containing equivalent amounts of nonprotein nitrogen were fed to ruminants.

Another important object of this invention is to provide an improved feed product for ruminants including a starch bearing material such as cereal grain and urea, wherein at least a part of the starch portion of the grain is gelatinized after addition of the urea thereto to favorably improve the reaction rate of the urea in the rumen of the animal. Rumen micro-organisms require energy for the conversion of urea or other nonprotein nitrogen to microbial protein. When untreated starch is fed, the rate of energy release from this starch is apparently too slow to provide the micro-organisms with the necessary energy to convert the rapidly evolving ammonia from urea to microbial protein. When starch is partially gelatinized, the carbohydrate material and the nitrogenous substance are broken down at substantially the same rate, resulting in the most efficient production of microbial protein. Such improved results are also believed to be attributable to more complex blending of the urea with the grain, and the cellular character of the gelatinized starch matrix carrying the urea therein contributes to more uniform and controlled release of the urea at a desirable rate for most efficient utilization thereof without toxic effects.

Another important object of this invention is to provide a method for processing a mixture of starch feed material and urea without using pressure or water to cause gelatinization of the starch in the mixture, so that the urea is rendered more palatable, less toxic, and a more efficient source of nonprotein nitrogen than similar ungelatinized mixtures heretofore produced.

Another important object of this invention is to decrease the caking tendency that exists in pellets and additionally to decrease the difficulty in pelleting which arises when more than 5 percent by weight urea is included in the formula.

The amount of protein necessary for the maintenance and wellbeing of a ruminant depends on the animal itself, as well as the nature of the industry in which the animal is used, i.e., a steer being fattened for slaughtering may require a different amount of protein intake than a lactating dairy cow. Thus, the amount of protein to be administered is a matter of selection and likewise, the amount of nonprotein nitrogen used as a supplement is based on the requirements of the particular industry. It is to be understood that it is not only the relative quantity of nonprotein nitrogen contained in the feed which causes the detrimental effects explained above, but also the total nonprotein nitrogen intake in a given period.

Generally, the novel improved nonprotein nitrogen supplement ruminant feed of the instant invention, which allows an equivalent protein content of 145–258 percent (50–90 percent urea content with the balance being a starch-containing material, such as corn), is produced by admixing starch-bearing material containing vegetable material with molten urea (M.P. 133° C.), whereby heating of the grain by the molten urea results in attainment of the starch gelatinization temperature. Specifically, by way of explanation, food processing methods, including composition of mixtures, temperatures, and identification of components, are given below. However, it is to be understood and appreciated that the scope of the present invention is substantially broader than the examples given to explain certain limited and specific forms of the invention.

It is to be understood that although the product of the instant invention may be formulated from various starch-bearing food materials such as sorghum grain, wheat, corn or starch-containing vegetables, it is preferred that a cereal grain be used. It is to be further understood and appreciated that processing of the grain to an extent to produce any degree of gelatinization of the starch therein is sufficient to improve the characteristics of the mixture and thus render the urea therein more usable than a similar relative amount would be in an ungelatinized feed mixture.

One suitable formulation of the improved food product of the instant invention may be defined as a supplement containing a protein equivalent of about 200 percent (See example 4.) This protein equivalent figure is calculated on the basis that 100 pounds of urea containing 46 percent nitrogen is equivalent to 287 pounds of protein derived from corn. The feed product above contains approximately 7 parts urea by weight for each 3 parts corn by weight, this being based on the average ruminant animal and conventional feeding methods and practices. However, as mentioned above, the formulation is adjustable as required for the most efficient utilization thereof by specific animals or herds of animals. Thus, if the ratio were reversed so that for every 3 parts of urea by weight the mixture contained 7 parts corn by weight, the equivalent protein would be approximately 84 percent (also a suitable formulation).

It has been found that in order to attain a starch gelatinization, it is not necessary to employ pressure or water (other than that present in the grain), but rather the heat supplied by the molten urea will accomplish the desired starch gelatinization.

Although, in the following examples, the (molten) urea is added to the starch-containing material, this is a mechanical convenience. The grain can be added to the urea (whether or not molten), or vice versa. In fact, mixtures of urea and grain can be made up, and then the mixture heated.

The heating temperature should be above the melting point of urea (133° C.) but should not be higher than about 200° C. A preferred range is 135°–145° C.

The time of heating is not critical; suitably it is 5–120 minutes, with heating time being somewhat dependent on the state of subdivision of the starch-containing material.

In the process of this invention, the urea: starch-containing material can be in the weight range of 0.25–9:1.

EXAMPLE 1

One thousand grams of urea (46 percent N) was heated until it melted. Heating was then continued until the molten urea attained a temperature of 160° C. Said urea was then poured into a beaker containing 1,000 g. of ground corn (10 percent $H_2O$ and all passing a 10 mesh screen) at a temperature of 25° C. The molten urea was stirred into the corn with a spatula, yielding a plastic mass. Stirring was continued as the product solidified and cooled to ambient temperature. The cooled material was then passed through a size reduction mill to yield a product passing a 16 mesh screen, and suitable for incorporation in animal feeds. The protein equivalent was 147 percent.

EXAMPLE 2

Six hundred grams of molten urea prepared as in example 1 was added to 1,400 g. of ground corn having a temperature of 80° C., stirred until cool and ground as in example 1. It was observed that a state of plasticity existed for a longer time, due to the higher temperature of the corn, indicating a potentially greater degree of gelatinization had been attained. The protein equivalent of the product was 86 percent.

EXAMPLE 3

One thousand grams of molten urea prepared as in example 1 was added to 1,000 g. of ground corn having a temperature of 80° C. This mix was maintained in a molten state at about 135°–145° C. for a period of 60 minutes with stirring, then allowed to cool and solidify, followed by grinding to the desired particle size, as in the preceding examples. It was observed that a state of plasticity existed throughout the period in which the material had a temperature in excess of 135° C., thus yielding a greater degree of gelatinization than in example 2. The protein equivalent of the produce was 147 percent.

EXAMPLE 4

One thousand four hundred grams of molten urea prepared as in example 1 was added to 600 grams of ground corn having a temperature of about 135°–145° C. This mix was heated within this temperature range for a period of 60 minutes with stirring, then allowed to cool and solidify, followed by grinding. It was observed that a state of plasticity existed throughout the period in which the material had a temperature in excess of 135° C. The protein equivalent of the product was 203.4 percent.

EXAMPLE 5

One thousand eight hundred grams of molten urea prepared as in example 1 was added to 200 g. of ground corn having a temperature of about 135°–145° C. This mix was heated within this temperature range for a period of 60 minutes with stirring then allowed to cool and solidify, followed by grinding. It was observed that a state of plasticity existed throughout the period that the material had a temperature in excess of 135° C. The protein equivalent of the product was 258.75 percent.

The processes described above result in production of a food product having partially or wholly gelatinized starch therein which contains more nonprotein nitrogen to supplement the diet of the ruminant than heretofore used and in a much more economical manner than previously possible.

As is well known, an animal fed with a mixture of urea and gelatinized starch will convert a greater quantity of ammonia from urea to bacterial protein than one fed with a mixture where the starch portion is ungelatinized. Further, the gelatinized food product is more palatable than ungelatinized mixtures containing an equivalent amount of nonprotein nitrogen, thus minimizing food wastage.

Likewise, the phenomenon of gelatinization has been heretofore disclosed in various publications, and many theories have been advanced for the mechanisms of the occurrence, including the theory that starch chains in ungelatinized starches are held together by glucoside linkages such that ungelatinized starch is substantially insoluble in water, and that these linkages are broken down and simpler carbohydrates are formed during the gelatinization of hydrolyzation of the starch such that the gel structure results. However, it is not the intention of the inventors of the present invention to be limited by any particular starch-producing mechanism, but rather only that typical gelatin characteristics are present in the novel product.

It is to be understood that the present invention is not limited to an admixture of urea plus a starch-bearing material in the nature of grain, but also applies to various feed mixtures which include for example a mixture of grains, a mixture of grain or grains with a roughage source such as dehydrated alfalfa, or even a complete ration containing in various combination, grain or grains, roughage, minerals and vitamin supplements.

What is claimed is:

1. The method of preparing a urea starch feed additive comprising heating together urea and a starch-containing material in a respective weight ratio of 0.25 to 9:1 at a temperature of at least 133° C., under substantially anhydrous conditions and at atmospheric pressure until at least a substantial portion of the starch gelatinizes and a homogenous dispersion of urea and starch is formed; and thereafter cooling and comminuting the product.

2. The method according to claim 1, in which the heating temperature is within the range of 133°–200° C.

3. The method according to claim 1, in which the starch feed additive is chosen from the group consisting of corn, sorghum grain, wheat, starch-containing vegetables, or cereal grain.

4. The method according to claim 1, in which the starch-containing material is heated prior to the addition of the urea.

5. The method according to claim 1, in which the urea is heated to a molten state prior to being added to the starch-containing material.

* * * * *